(12) United States Patent
Cook

(10) Patent No.: US 7,397,222 B2
(45) Date of Patent: Jul. 8, 2008

(54) ON-LINE TESTABLE SOLID STATE REVERSING DC MOTOR STARTER

(75) Inventor: Bruce M. Cook, Pittsburgh, PA (US)

(73) Assignee: Westinghouse Electric Co LLC, Pittsburgh, PA (US)

( * ) Notice: Subject to any disclaimer, the term of this patent is extended or adjusted under 35 U.S.C. 154(b) by 51 days.

(21) Appl. No.: 11/512,916

(22) Filed: Aug. 30, 2006

(65) Prior Publication Data

US 2008/0054857 A1    Mar. 6, 2008

(51) Int. Cl.
| H02P 3/00 | (2006.01) |
| H02P 9/06 | (2006.01) |
| H02P 11/00 | (2006.01) |
| H02P 15/00 | (2006.01) |
| H02H 5/04 | (2006.01) |
| H02H 7/08 | (2006.01) |
| G01R 31/06 | (2006.01) |

(52) U.S. Cl. .................. 322/13; 361/23; 361/24; 324/545; 324/546

(58) Field of Classification Search ............. 322/13; 361/23, 24; 324/545–546

See application file for complete search history.

(56) References Cited

U.S. PATENT DOCUMENTS

| 3,505,581 | A | * | 4/1970 | Montross et al. | 318/434 |
| 3,551,774 | A | * | 12/1970 | Rusch | 388/830 |
| 3,562,617 | A | * | 2/1971 | Meier et al. | 388/830 |
| 3,569,806 | A | * | 3/1971 | Brailsford | 318/254 |
| 3,656,136 | A | * | 4/1972 | Blair | 318/490 |
| 3,693,047 | A | * | 9/1972 | Hamstra | 361/24 |
| 3,791,473 | A | * | 2/1974 | Rosen | 180/65.2 |
| 3,893,029 | A | * | 7/1975 | Vensel et al. | 324/772 |
| 3,936,744 | A | * | 2/1976 | Perlmutter | 324/772 |
| 4,008,422 | A | * | 2/1977 | Sodekoda et al. | 318/138 |
| 4,217,526 | A | * | 8/1980 | Farr | 318/139 |
| 4,257,092 | A | * | 3/1981 | Prines et al. | 363/124 |
| 4,393,338 | A | * | 7/1983 | Jones et al. | 318/86 |
| 4,459,548 | A | * | 7/1984 | Lentz et al. | 324/772 |
| 4,467,261 | A | * | 8/1984 | Lamaster | 318/810 |
| 4,544,869 | A | * | 10/1985 | Pittaway | 318/293 |
| 4,549,121 | A | * | 10/1985 | Gale | 318/271 |
| 4,622,499 | A | * | 11/1986 | Squires et al. | 318/254 |
| 4,879,502 | A | * | 11/1989 | Endo et al. | 318/723 |
| 5,023,527 | A | * | 6/1991 | Erdman et al. | 318/254 |
| 5,087,865 | A | * | 2/1992 | Nelson, III | 318/139 |
| 5,126,642 | A | * | 6/1992 | Shahrodi | 318/433 |
| 5,223,779 | A | * | 6/1993 | Palaniappan | 318/701 |
| 5,243,243 | A | * | 9/1993 | Andrews | 310/72 |
| 5,267,138 | A | * | 11/1993 | Shores | 363/98 |
| 5,341,080 | A | * | 8/1994 | Agut Sanz | 318/778 |
| 5,416,399 | A | * | 5/1995 | Brunson | 318/778 |
| 5,568,033 | A | * | 10/1996 | Brunson | 318/778 |
| 5,608,301 | A | * | 3/1997 | Inaniwa et al. | 318/729 |
| 5,661,382 | A | * | 8/1997 | Enami et al. | 318/439 |
| 5,672,944 | A | * | 9/1997 | Gokhale et al. | 318/254 |

(Continued)

Primary Examiner—Darren Schuberg
Assistant Examiner—Pedro J Cuevas

(57) ABSTRACT

A solid state reversing DC motor starter that is testable on-line and satisfies the requirements for nuclear safety grade equipment. The motor starter employs a bridge of solid state switches which connect the polarity of the motor winding to conform to the desired direction of travel. The reversing switch bridge is in series with the main switch that is coupled in parallel with a reduced current by-pass flow path.

17 Claims, 5 Drawing Sheets

U.S. PATENT DOCUMENTS

| | | | | |
|---|---|---|---|---|
| 5,701,089 A * | 12/1997 | Perkins | | 324/772 |
| 5,703,768 A * | 12/1997 | Kanna et al. | | 363/98 |
| 5,814,965 A * | 9/1998 | Randall | | 318/701 |
| 5,828,559 A * | 10/1998 | Chen | | 363/56.05 |
| 5,859,506 A * | 1/1999 | Lemke | | 315/308 |
| 5,929,617 A * | 7/1999 | Brokaw | | 323/280 |
| 6,038,114 A * | 3/2000 | Johnson | | 361/23 |
| 6,166,500 A * | 12/2000 | Makaran | | 318/254 |
| 6,294,888 B1 * | 9/2001 | Becker | | 318/471 |
| 6,304,045 B1 * | 10/2001 | Muszynski | | 318/439 |
| 6,321,030 B1 * | 11/2001 | Cummins | | 388/800 |
| 6,777,941 B2 * | 8/2004 | Thibedeau et al. | | 324/378 |
| 6,815,920 B2 * | 11/2004 | Cohen et al. | | 318/599 |
| 6,842,669 B2 | 1/2005 | Bednar et al. | | 700/292 |
| 6,914,413 B2 * | 7/2005 | Bertness et al. | | 320/104 |
| 6,924,613 B2 * | 8/2005 | Jonsson et al. | | 318/432 |
| 6,969,962 B2 * | 11/2005 | Oe | | 318/254 |
| 6,984,950 B2 * | 1/2006 | Jonsson et al. | | 318/440 |
| 7,006,338 B2 * | 2/2006 | Mayhew et al. | | 361/23 |
| 7,126,341 B2 * | 10/2006 | Bertness et al. | | 324/426 |
| 7,130,170 B2 * | 10/2006 | Wakefield et al. | | 361/23 |
| 7,154,276 B2 * | 12/2006 | Bertness | | 324/503 |
| 7,262,579 B1 * | 8/2007 | Shepard | | 318/810 |
| 7,319,579 B2 * | 1/2008 | Inoue et al. | | 361/118 |
| 7,323,833 B2 * | 1/2008 | Mir | | 318/100 |
| 7,336,044 B1 * | 2/2008 | Churchett et al. | | 318/280 |
| 7,342,371 B2 * | 3/2008 | Zuzuly et al. | | 318/434 |
| 2004/0104696 A1 * | 6/2004 | Oe | | 318/254 |
| 2004/0155622 A1 * | 8/2004 | Mayhew et al. | | 318/778 |
| 2005/0185350 A1 * | 8/2005 | Wakefield et al. | | 361/23 |
| 2005/0200326 A1 * | 9/2005 | Mayhew et al. | | 318/600 |
| 2007/0145917 A1 * | 6/2007 | Baer et al. | | 318/107 |
| 2007/0170289 A1 * | 7/2007 | Okada et al. | | 241/46.013 |
| 2007/0188125 A1 * | 8/2007 | Shepard | | 318/778 |
| 2008/0007270 A1 * | 1/2008 | Xiao et al. | | 324/546 |
| 2008/0043500 A1 * | 2/2008 | Asano et al. | | 363/56.12 |
| 2008/0054831 A1 * | 3/2008 | Cook | | 318/434 |
| 2008/0054840 A1 * | 3/2008 | Cook | | 318/778 |
| 2008/0056688 A1 * | 3/2008 | Harrington | | 388/809 |
| 2008/0074157 A1 * | 3/2008 | Horai et al. | | 327/110 |

* cited by examiner

ON-LINE TESTABLE SOLID STATE REVERSING DC MOTOR STARTER

CROSS REFERENCE TO RELATED APPLICATIONS

This Application is related to co-pending applications Ser. Nos. 11/512,474 and PCT/US07/76965 filed concurrently herewith.

BACKGROUND OF THE INVENTION

1. Field of the Invention

This invention relates in general to DC motor starting circuits and more particularly to DC motor starting circuits that are testable on-line.

2. Background of the Invention

One of the new generation advanced passive nuclear power plants supplied by Westinghouse Electric Company, LLC, Pittsburgh, Pa. known as the AP1000 plant, has no class 1E AC power source. The plan is to use the 125 VDC power station batteries to operate safety grade valves to control various aspects of the nuclear power generation process. The intent is to use DC motors to operate valves that are either to large for solenoid powered operators or which must have a "fail-as-is" characteristic. A suitable DC motor starter is not commercially available to meet the particular requirements of nuclear class 1E equipment.

Additionally, the trend has been to increase the operating fuel cycles of nuclear plants to enhance their efficiency. This mode of operation puts a further strain the reliability of the nuclear components due to the extended time between outages during which the equipment may be serviced.

Accordingly, it is an object of this invention to provide a solid state reversing DC motor starter that can meet the stringent requirements of nuclear safety systems.

Furthermore, it is an object of this invention to provide such a solid state reversing DC motor starter that is testable on-line to ensure its integrity.

Further, it is an object of this invention to provide such a DC motor starter that is immune to single failure caused spurious actuations.

It is also an object of this invention to provide such a DC motor starter that is testable on-line without requiring motion of the motor.

SUMMARY OF THE INVENTION

The foregoing objects are achieved by a solid state DC motor starter in accordance with this invention, that has a test capability that will test a plurality of the components of the solid state DC motor starter while the motor starter is connected between a power source and a motor that the motor starter actuates, without actuating the motor. The motor starter includes a main switch for turning on and off the solid state DC motor starter and the motor and a test circuit for testing the motor starter's internal components, in parallel with the main switch. The test circuit includes a current reducing component, a test switch in series with the current reducing component that connects a reduced current to the motor windings, and a means for monitoring the voltage downstream of the output of the respective plurality of components. Preferably, the reduced current is below the value of current that will cause actuation of the motor and is approximately 50 mA or less and the current reducing component is a resistor in the order of 2,500 ohms.

Desirably, the solid state motor starter of this invention includes a reversing circuit connected between the main switch and the motor. The reversing circuit is responsive to an OPEN input to connect a winding of the motor to the main switch with a first polarity and is responsive to a CLOSE input to connect the motor winding to the main switch with a second polarity wherein the reversing circuit cannot be energized unless the main switch is turned on and a signal is received at either the OPEN input or the CLOSE input. Preferably, the OPEN input and the CLOSE input are interlocked so that a signal cannot be communicated through the OPEN input and the CLOSE input at the same time. In one preferred embodiment the OPEN input or the CLOSE input that is not blocked by the interlock, is latched in an on condition for a predetermined period of time. When in the testing mode, if a signal is received at either the OPEN input or the CLOSE input and the main switch is turned on while the test switch is on, the motor will actuate.

Preferably the solid state motor starter of this invention includes a control logic circuit wherein the control logic assures a signal is received at either the OPEN input or the CLOSE input before the main switch is turned on. Desirably, the logic circuit will turn off the main switch, the OPEN input and the CLOSE input for a predetermined period of time if a signal is received at either the OPEN input or the CLOSE input at a time when the other of the OPEN input or the CLOSE input is on. Advantageously, the predetermined period of time is sufficient to allow the motor to stop and any electrical transients to subside. Following the predetermined period of time the control logic circuit will issue the signal to a one of the OPEN input or CLOSE input that will cause the motor to reverse direction from the last actuation and turn on the main switch. Typically, the predetermined period of time is approximately one second or longer.

Desirably the reversing circuit comprises a plurality of reversing polarity switches and the control logic circuit turns off the reversing polarity switches a predetermined interval after the main switch is turned off. The predetermined time interval is long enough to allow transients due to inductive current switching to subside before the reversing polarity switches are turned off. During a test of the main switch the reversing polarity switches are turned off so that current only flows through the shunt winding of the motor so that no motor motion occurs. In another embodiment the main switch includes a snubber circuit in parallel to dissipate inductive transients.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
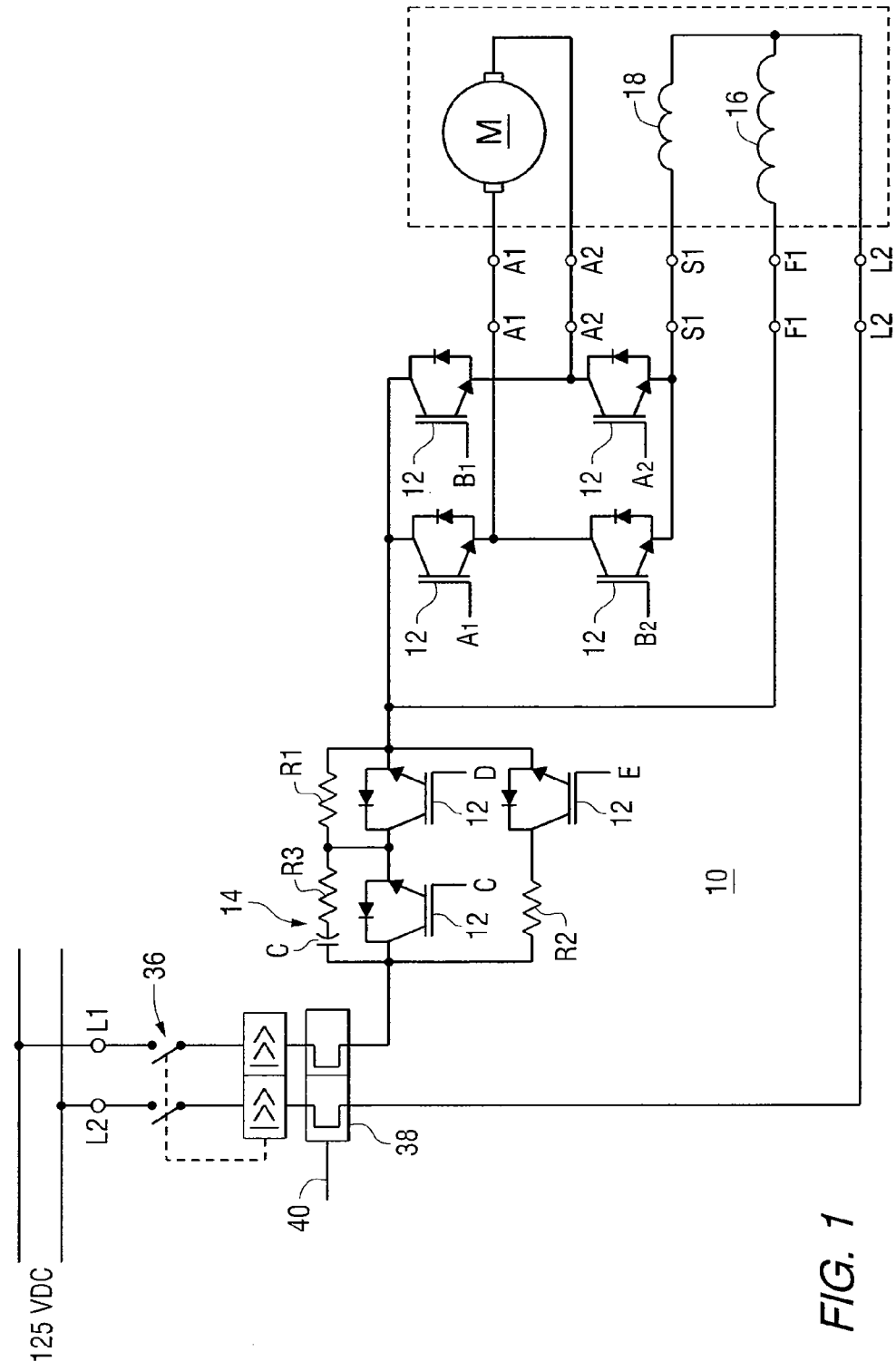
FIG. 1 is a circuit schematic of the DC motor starter of this invention.

The new generation of passive nuclear plants offered by Westinghouse Electric Company, LLC, Pittsburgh, Pa., are designed to not have any safety grade AC power sources. To the extent that power is needed for plant safety following a design basis event, it will be provided from storage batteries. Some of the safety class valves are designed to be operated by DC motors drawing power from these batteries. Therefore, it is necessary to have a reversing DC motor starter to control these valves. State of the art motor operated valves rely on AC motors. Therefore, reversing DC motor starters, particularly those meeting the specific requirements for nuclear safety grade equipment, are not commercially available. Accordingly, there is a need for such reversing DC motors starters, particularly those meeting the specific requirements for nuclear safety grade equipment, whose reliability can be verified on-line.

Operating nuclear plants use motor starters based on electro-mechanical contactors to switch the motor current. These contactors typically have reliability issues due to the arcing that occurs when high currents are interrupted. These issues are aggravated in DC circuits because there is no inherent voltage and current reversal to extinguish the arc. This invention satisfies the foregoing needs by employing present state of the art power semiconductors that have sufficient capacity to switch motor currents. For example, insulated gate bipolar transistors (IGBT), such as those manufactured by Powerex, Inc., Youngwood, Pa. can switch 600A at 600V.

A motor starter includes all components necessary to control the motor's starting, running and stopping, including protection from short circuits and overload conditions. For the AP1000 plant, the motor operated valves will have DC motors with compound windings (combination series and shunt) ranging in size from 1 HP up to 20 HP and perhaps larger. The motor size is determined to achieve a 25 second (or less) stroke time at 80% of nominal voltage. This invention provides a motor starter capable of satisfying the needs of such an application with the following characteristics:

- Short circuit protection is provided by a magnetic type circuit breaker.
- Thermal overload protection is appropriately sized (e.g., per Annex B of IEEE Standard 741-1997), but is bypassed upon safety actuation per Nuclear Regulatory Commission Guide 1.106.
- The motor starter reverses the direction of rotation of the motor by switching the polarity of the armature windings.
- The motor starter logic makes it impossible to reverse the direction of the motor without first stopping the motor for a period of time sufficient to allow any arcing to be suppressed.
- Motors of 5 HP in size, or larger, are started under reduced voltage to limit the starting current to no more than 250 percent of the rated current at the maximum battery equalization voltage of 140 VDC.
- The motor starter circuits need to be capable of being tested on-line without causing motion of the valve.

The last capability has typically not been required for operating power plants. Traditionally, testing of the motor starter is usually done in conjunction with that of the valve itself by actually stroking the valve over its range of motion. However, in some cases, it is not practical to do such a test while the plant is at power due to the effects of opening or closing the valve on the nuclear power generation process. In such cases, the test frequency is made to coincide with plant outages. The resulting decrease in reliability has heretofore been tolerated, however, that becomes less acceptable as the operating fuel cycles are lengthened. If the motor starter is testable at more frequent intervals, then its reliability can be improved.

FIG. 1 shows the power circuit 10 of the motor starter of this invention using IGBT devices 12 such as the Powerex part number PM400DVA060 Intellimod™ IPM half bridge packages. These devices are high speed, low loss IGBT's with optimized gate drive and protection circuitry. The use of half bridge packages will simplify the design by grouping the C-D, $A_1$-$B_2$ and $A_2$-$B_1$ devices. The 400A and 600V ratings of these devices will be sufficient for all motor sizes needed on the AP1000 plant, but a 600A device is also available in the 600V rating.

In the circuit 10, shown in FIG. 1, the motor rotation direction is selected by first turning on either the $A_1$-$A_2$ or the $B_1$-$B_2$ pair of devices 12. Then turning on the C device 12 will apply power to the motor. Initially, the motor current is provided through the R1 resistor to limit the starting current. After a delay time, the D device 12 is turned on to allow full current to flow. Turn off of the A, B and D devices will be delayed by the control logic, more fully described hereafter, so that the C device 12 is always used to interrupt the motor current. A snubber circuit 14 (the series connection of resistor R3 and capacitor C) is connected across the C device 12 to limit the transient voltages that will occur when the motor current is interrupted. The values of the resistor R3 and capacitor selected for the snubber 14 will depend on the motor size. i.e., its inductance, and will have to be determined experimentally. As an example of the sizing the R1 resistor, a 19.5 HP motor has a full load (FLA) current of 116.4 Amps and a locked rotor current (LRA) of 291 Amps. Under full voltage starting conditions, the LRA would exist briefly, determined by the resistance of the series field winding and the armature winding with no back electro-motive force being produced. Thus the motor resistance is given by:

$$R_L = \frac{V}{LRA} = \frac{125\ V}{291 A} = 0.430 \Omega$$

To limit the starting current to 250 percent of the rated current, the total circuit resistance must be:

$$R_1 + R_L = \frac{V}{2.5 \times FLA} = \frac{140\ V}{2.5 \times 116.4 A} = 0.481 \Omega \text{ or } R_1 = 0.051 \Omega$$

During the time delay when this resistor is conducting, it will dissipate 4.3 kW and must be sized accordingly. The setting of the time delay before the turn on of the D IGBT device 12 will be determined for each motor based on the motor's acceleration, but will be in the order of 1 second.

The IGBT device E is provided for the purpose of testing the motor starter without running the motor. When the E is turned on the series resistor $R_2$ is placed across the open main switch C (and D). This resistor will have a value of approximately 2500 ohms thus limiting the current through the motor windings to approximately 50 mA. When E is first turned on the voltage measured across the F1-L2 terminals will be that which is determined by the voltage divider consisting of $R_3$ and the motor shunt winding 16. This will be a specific value for each motor size. Then by turning on the $A_1$-$A_2$ IGBT pair, the low current is sent through the motor series winding 18 and armature M. The voltage across the F1-L2 terminal will drop to 6.25÷LRA volts. This test confirms the connectivity to the motor and the functionality of the $A_1$-$A_2$ IGBT devices. Next, the $A_1$-$A_2$ IGBT devices are turned off and the $B_1$-$B_2$ IGBTs are turned on. This confirms the functionality of the $B_1$-$B_2$ IGBT devices. Finally, the $B_1$-$B_2$ and E IGBTs are turned off and the C device is turned on followed by, after the set time delay, the turn on of the device D. The initial voltage across the F1-L2 will be slightly less than the line voltage, with a small but perceptible increase in voltage at the time of the delay setting. This test confirms the functionality of the C and D IGBT devices. Since the A and B devices are all off during the last step of the test, current only flows through the shunt winding 16 of the motor, hence no motion occurs. The combination of the test steps also prove the functioning of the motor starter logic.

Figure 2:
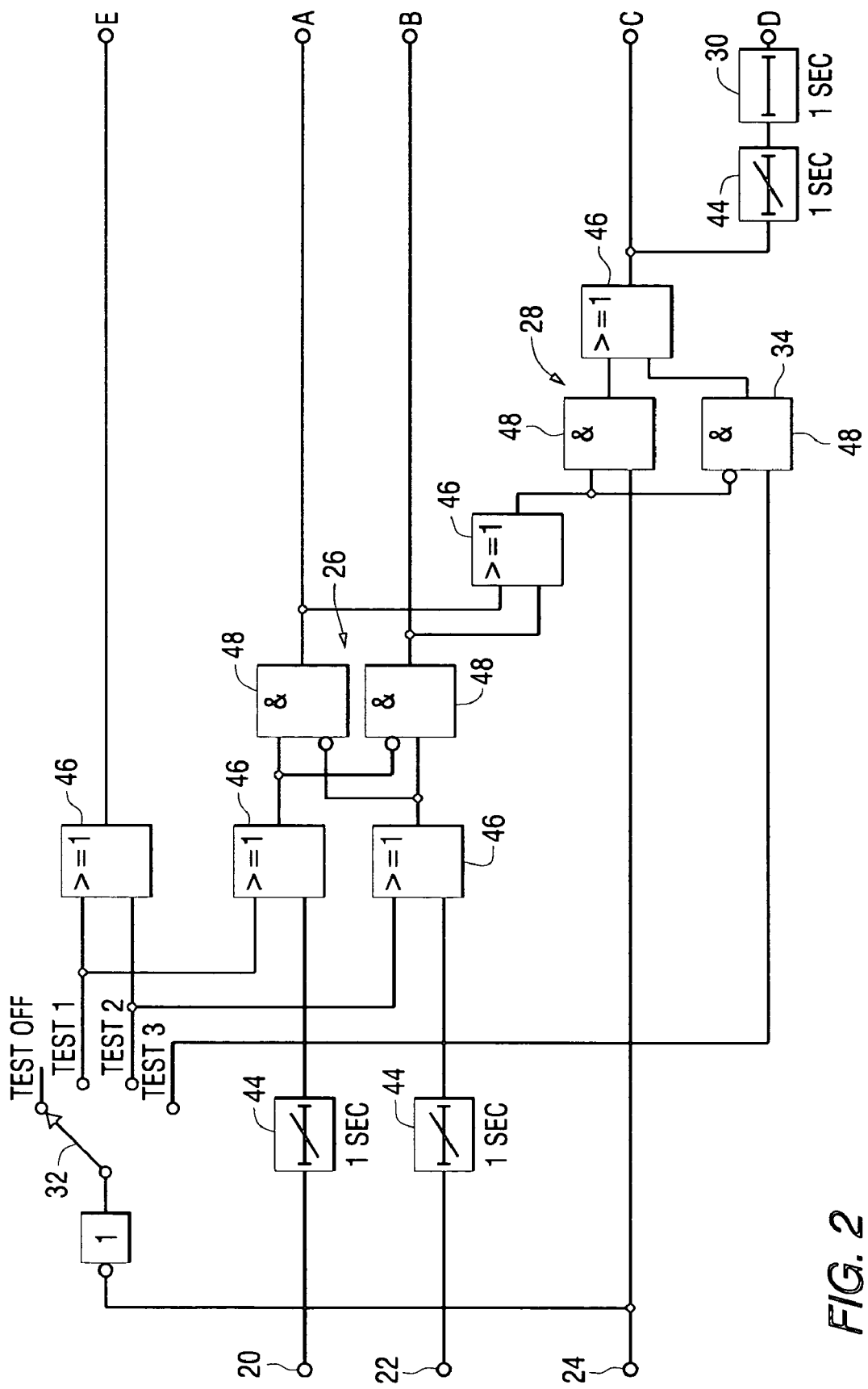
FIG. 2 is a circuit schematic of the motor starter control logic of this invention.

The logic necessary to accomplish the motor starter functions, including test, is shown in FIG. 2. This logic has the following features:

- The A output is connected to the gates of both $A_1$ and $A_2$ IGBT devices 12. Similarly, the B output is connected to the gates of both $B_1$ and $B_2$.
- The A and B output signals are interlocked at gates 26 so that both cannot be turned on at the same time. This prevents a short across the armature of the motor.
- the turn-off of the A, B and D outputs is delayed by timers 44 for one second to ensure that the motor current interruption is done via the C device 12 which has the snubber circuit 14. The one second delay is arbitrary and is chosen to allow transients due to the inductive current switching to subside.
- Device C cannot be turned on (in normal operation) unless either A or B is on as a result of the arrangement of the gates 28.
- Device D is turned on after a set delay from the turn on of device C as the result of timer 30. This time delay is normally 1 second, but should be chosen based on the acceleration time of the motor.
- The test switch 32 cannot turn on device C in position 3 if either of the A or B outputs is on, as controlled by gate 34. This prevents spurious motor operation during the test.
- As a result of the arrangement of gate 34, if a valid motion command occurs during a test, the test signals routed through the switch C are turned off and the command will start the motor as usual. Thus the test switch does not defeat normal motor starter operation.
- In the event that an immediate reversal command is issued before the valve has completed travel under the preceding command, turn off will be delayed until the valve has completed it's travel under the previous command and the simultaneous new command with the delay turn off of the previous command will cause both A and B outputs to turn off as well as the C output. Following the time delay provided by the timers 44, which should be sufficient to allow the motor to stop and transients to subside, the new command will be asserted and the main switch (C) turned back on.

The logic is simple enough that it can be implement with discrete logic gates and timer devices as shown in FIG. 2. The timer devices are shown as blocks with a scale centered in it. A slash through the scale indicates that the transition from the ON state to the OFF state is delayed. OR gates are shown by a block with the symbol >=1 in the block and AND gates are shown as a block with an &. Inverted inputs are designated in FIG. 2 by an "O" at the input to a gate. If the logic were implemented with diode-transistor logic, it would be possible to operate directly from the 125 VDC power source without the need for a power supply. Alternatively, a DC-DC converter could be used to derive the logic power supply from the control power.

The remaining components of the motor starter are the protection devices that prevent over current conditions. The first is a magnetic operated circuit breaker 36 shown in FIG. 1 that provids short circuit protection. It is a two pole device rated for DC operation that will interrupt both lines. This is required since the power source is ungrounded. This device must carry the LRA without interrupting, but must interrupt current at a value less than the upstream protection for the entire motor control center of the reactor's safety division.

The second protection device is a thermal overload relay 38. It provides a contact output 40 to the valve control logic performed by the Component Interface Module 42 illustrated in FIG. 3. Under conditions of normal valve operation, the overload signal will interlock the output commands to stop the motor on an overload condition. However, if the valve command is due to a safety system actuation, the overload interlock is blocked and the motor is allowed to continue to operate until the valve stroke limit is reached (as determined by the travel limit switch and/or torque limit switch) or until the motor burns out. In either case, an alarm signal is generated by the valve control logic.

Both of these protection devices are commercially available from various electrical equipment manufacturers as standard catalog items.

Figure 3:
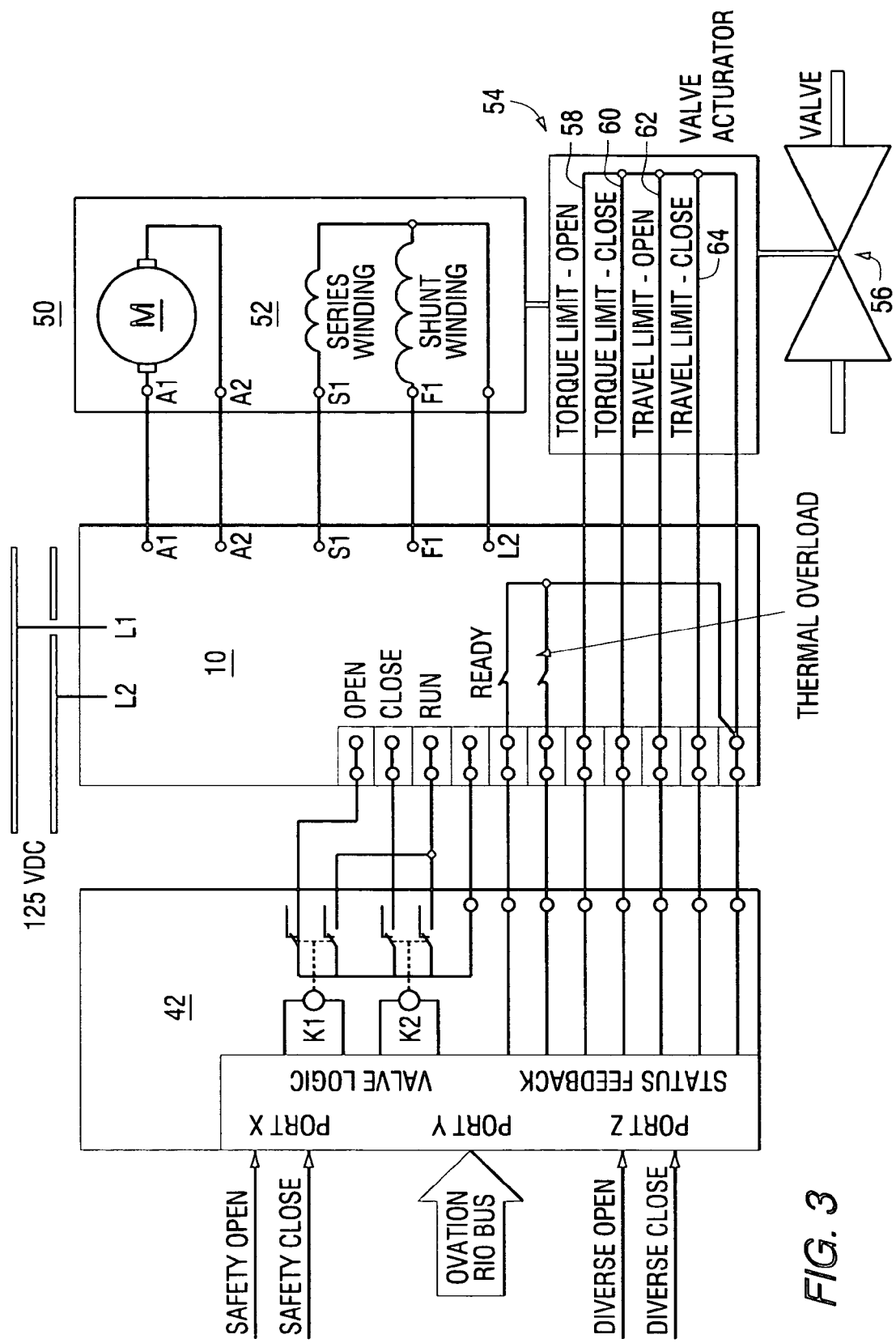
FIG. 3 is a representation of the motor starter of this invention applied to a motor operated valve application.

The preferred implementation of a motor operated valve controller using the solid state motor starter of this invention is shown in FIG. 3. The valve assembly 50 consists of the DC motor 52, a valve actuator 54 that provides speed reduction gearing and conversion linkage to convert the rotary motion of the motor 52 to linear valve stem motion, and the valve itself 56. The valve actuator 50 contains four limit switches 58, 60, 62 and 64, two operated by motor torque 58, 60 and two by valve stem position 62, 64. The logic of issuing the commands from the instrumentation and control systems to the motor starter is performed by a Component Interface Module 42, which is a programmable device offered by Westinghouse Electric Company, LLC, Pittsburgh, Pa., for control of plant equipment such as motor operated valves. The logic performed by the Component Interface Module 42 is jumper configurable to accommodate various plant equipment. The Component Interface Module is more fully described in U.S. Pat. No. 6,842,669, issued Jan. 11, 2005 to Westinghouse Electric Company LLC.

Figure 4A:
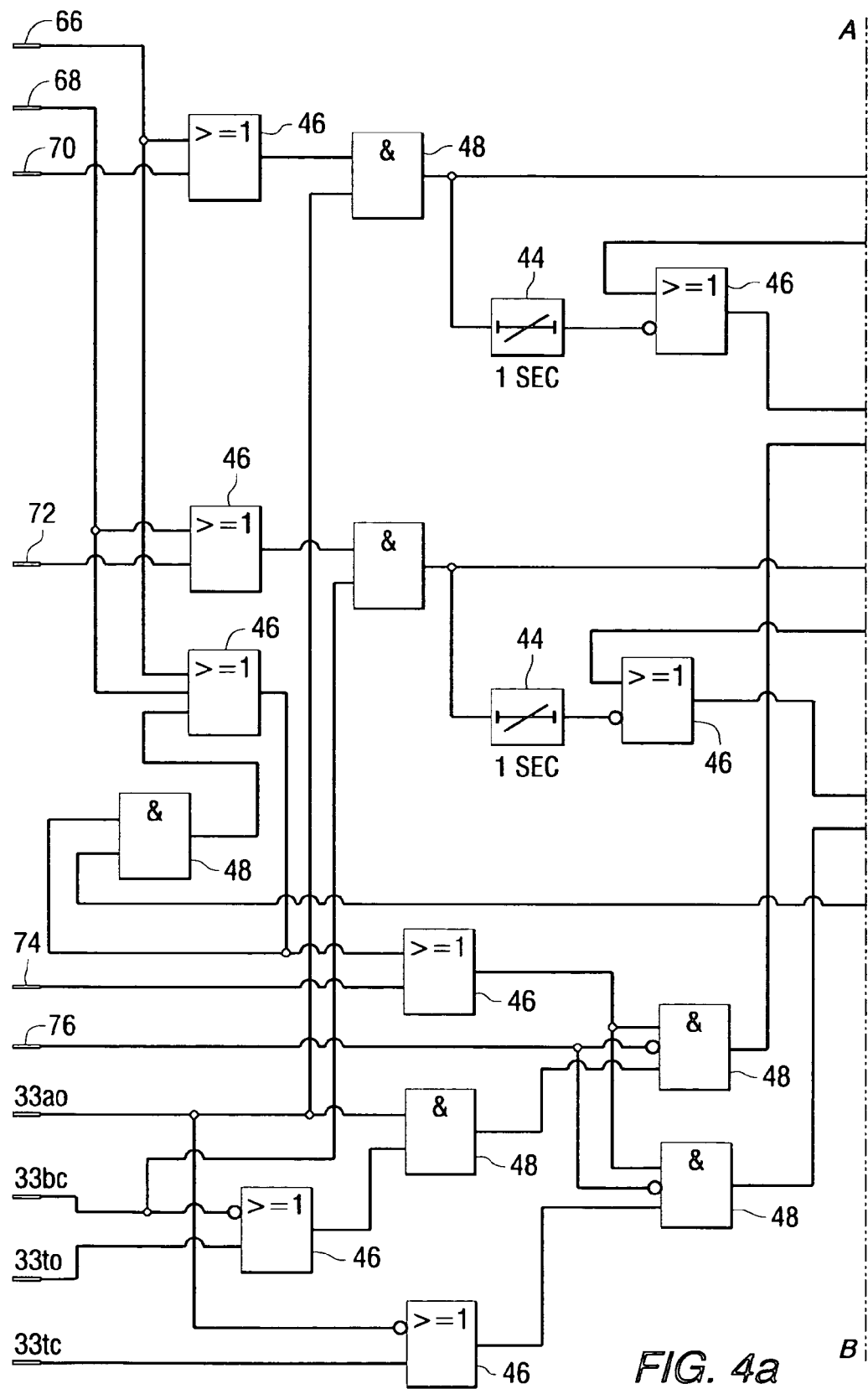
FIGS. 4a and 4b are circuit schematics of the motor operated valve control logic of this invention.
Figure 4B:
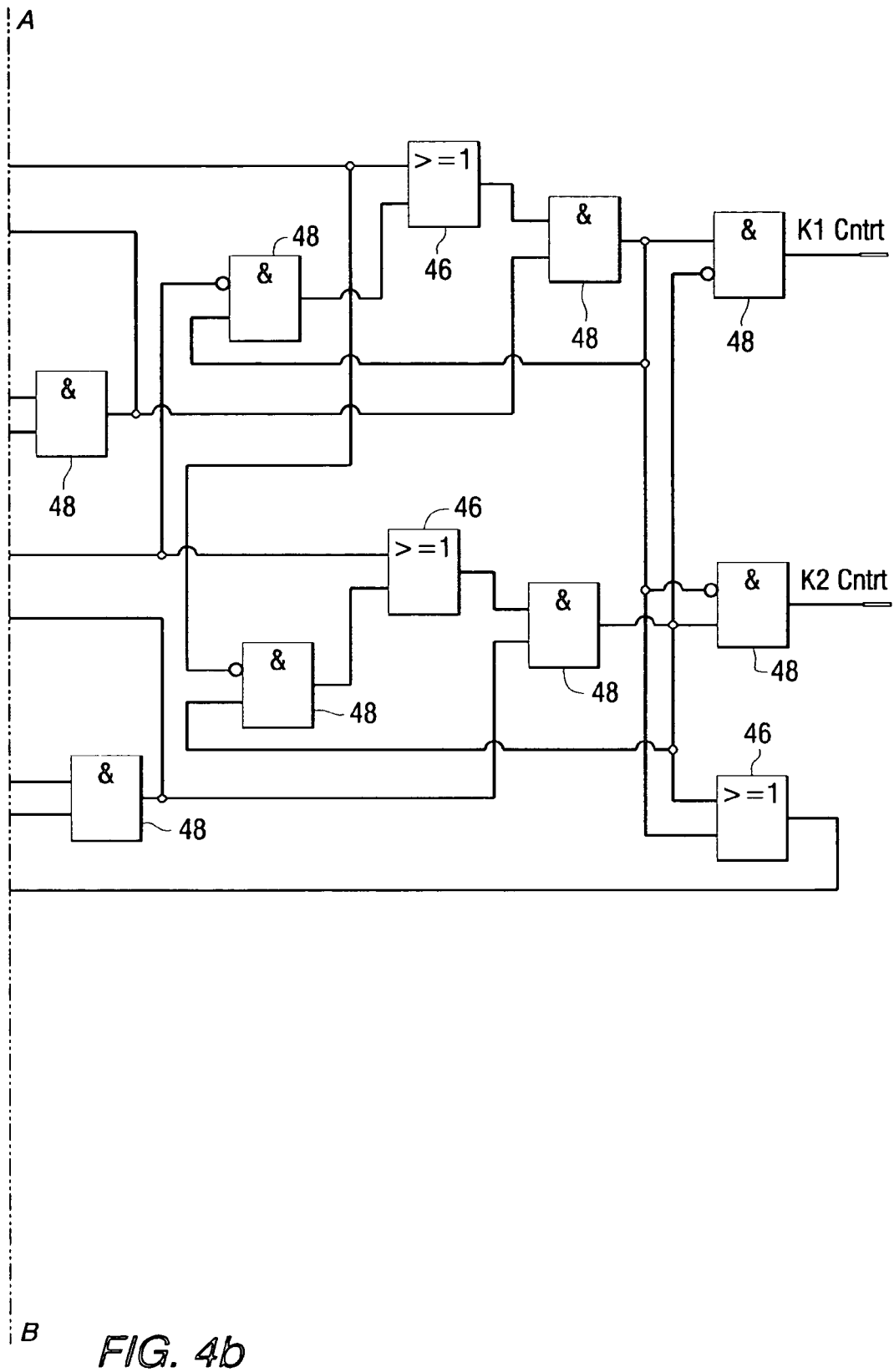

The logic to control the valve that is driven from this motor starter is shown in FIG. 4. This logic is derived from the universal Component Interface Module 42 logic previously shown in FIG. 3. For clarity, the configuration jumpers are not shown. Also, features of the universal logic provided for the purpose of diagnostics and maintenance have been omitted from this figure for simplicity. The valve control logic shown in FIG. 4 has the following features:

- Commands from the reactor instrumentation and control systems enter as Normal Open/Close 70, 72 or Safety Open/Close 66, 68. Usually the safety system will only use one of these commands. The Normal commands arrive to the Component Interface Module 42 via a remote input/output bus of a distributed processing system which is part of the instrumentation and control system.
- Commands are latched in the Component Interface Logic so that if the originating command is removed, valve travel will continue until the travel limit is reached as indicated by the timer circuits 44.
- If the system command inputs are maintained longer than the stroke time of the valve, the relay outputs K1 and K2 are nevertheless turned off when the travel limit is reached as indicated by the motor limit switches, so there is no standing voltage input to the motor starter.

The 33*ao* and 33*bc* inputs are the valve position limit switch inputs that are both closed (logic true) when the valve is in mid stroke. The corresponding switch opens when the valve reaches its travel limit in that direction.

Commands 66, 68, 70 and 72 are blocked in the direction corresponding to the present state of the valve. In other words, if the valve is already open, the open command 66, 70 will not be issued.

The 33*to* and 33*tc* inputs are from torque limit switches that are normally closed, and that open when the motor torque applied to the actuator exceeds a set value in the corresponding direction of travel. If a torque limit switch opens during valve travel, the output relays K1 and K2 are turned off thus stopping the motor.

In the opening direction, the output relay is turned off when the position limit switch opens, however, in the closing direction, the output is not turned off until the torque switch opens. This ensures a tight closing of the valve.

At the start of valve motion, the torque switch 58, 60 is blocked until the opposite position switch 62, 64 changes state indicating that the valve is "off seat".

During the first second of valve travel, if the torque switch 58, 60 causes the output to turn off, the output will be re-established when the torque switch recloses. This protects against contact bounce that may occur on the torque limit switch. After this initial second, the state of the torque stop is memorized such that the command must be removed and reinstated to cause motion to begin again.

The READY input 76 is a normally closed contact on the magnetic circuit breaker 36 in the motor starter circuit 10 that opens when the breaker is closed. If this input becomes true (contact closed) commands to the motor starter are blocked.

The thermal overload input 74 is a normal closed contact of the thermal overload protection relay in the motor starter circuit 10. In the event of an overload condition, this contact opens causing a false logic state.

If the command from the Instrumentation and Control System was a "Normal" command 70, 72, opening the thermal overload input 74 will cause the output relays K1, K2 to be de-energized and the motor will be stopped. However if the command was a "Safety" command 66, 68, this interlock is blocked. This block is latched until the output relays K1, K2 are de-energized so that if the safety command is removed during valve motion, the block remains in effect until the end of valve travel.

All of the Component Interface Module 42 inputs, the output states and various internal logic states are made available to the distributed processor of the instrumentation and control system via a remote input/output bus for the purpose of state signalization (indication), alarm generation and discrepancy logic.

Thus, this invention provides an on-line testable solid state reversing DC motor starter that can meet the requirements for nuclear safety grade equipment while enhancing reliability. While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breath of the appended claims and any and all equivalence thereof.

What is claimed is:

1. A solid state DC motor starter configured to have a test capability that will test a plurality of components of the solid state DC motor starter while the motor starter is connected between a power source and a motor that the motor starter actuates, without actuating the motor or taking the motor out of service, comprising:
   a main switch for turning the solid state DC motor starter and the motor on and off;
   a test circuit in parallel with the main switch, the test circuit comprising;
   a current reducing component;
   a test switch in series with the current reducing component, wherein when current is supplied to the parallel arrangement of the test circuit and the main switch with the main switch off the current reducing component maintains the current to the motor windings below a value that will actuate the motor when the test switch is turned on; and
   means for monitoring the voltage at an output of the respective plurality of components.

2. The solid state DC motor starter of claim 1 wherein the current reducing component maintains the current to the motor winding to approximately 50 mA or less.

3. The solid state DC motor starter of claim 1 wherein the current reducing component is a resistor of approximately 2,500 ohms.

4. The solid state DC motor starter of claim 1 including a reversing circuit connected between the main switch and the motor, the reversing circuit being responsive to an open input to connect a winding of the motor to the main switch with a first polarity and responsive to a closed input to connect the motor winding to the main switch with a second polarity wherein the reversing circuit cannot be energized unless the main switch is turned on and a signal is received at either the open input or the closed input.

5. The solid state DC motor starter of claim 4 wherein the open input and closed input are interlocked so that a signal cannot be communicated through the open input and the closed input at the same time.

6. The solid state DC motor starter of claim 5 wherein a signal communicated to either the open input or the closed input that is not blocked by the interlock, is latched in an on condition for a predetermined period of time.

7. The solid state DC motor starter of claim 4 wherein if the signal is received at either the open input or the closed input and the main switch is turned on while the test switch is on, the motor will actuate.

8. The solid state DC motor starter of claim 4 including a control logic circuit wherein the control logic circuit assures the signal is received at either the open input or the closed input before the main switch is turned on.

9. The solid state DC motor starter of claim 8 wherein the control logic circuit will turn off the main switch, the open input and the closed input for a predetermined period of time if the signal is received at either the open input or the closed input at a time when the other of the open input or the closed input is on.

10. The solid state DC motor starter of claim 9 wherein the predetermined period of time is substantially equal to the time required to allow the motor to stop and transients to subside.

11. The solid state DC motor starter of claim 10 wherein following the predetermined period of time the control logic circuit will issue the signal to a one of the open input or the closed input that will cause the motor to reverse its direction from a last actuation and turn on the main switch.

12. The solid state DC motor starter of claim 11 wherein the predetermined period of time is approximately 1 second or longer.

13. A solid state DC motor starter having a test capability that will test a plurality of components of the solid state DC motor starter while the motor starter is connected between a power source and a motor that the motor starter actuates, without actuating the motor, comprising:
   a main switch for turning the solid state DC motor starter and the motor on and off;
   a test circuit in parallel with the main switch, the test circuit comprising;
      a current reducing component;
      a test switch in series with the current reducing component, wherein the current reducing component maintains the current to the motor windings below a value that will actuate the motor when the test switch is turned on; and
      means for monitoring the voltage at an output of the respective plurality of components; and
   a reversing circuit connected between the main switch and the motor, the reversing circuit being responsive to an open input to connect a winding of the motor to the main switch with a first polarity and responsive to a closed input to connect the motor winding to the main switch with a second polarity wherein the reversing circuit cannot be energized unless the main switch is turned on and a signal is received at either the open input or the closed input, wherein the reversing circuit comprises a plurality of reversing polarity switches and the solid state DC motor starter further includes a control logic circuit wherein the control logic circuit turns off the reversing polarity switches a predetermined interval after the main switch is turned off.

14. The solid state DC motor starter of claim 13 wherein during a test of the main switch the reversing polarity switches are turned off so that current only flows through a shunt winding of the motor so that no motor motion occurs.

15. The solid state DC motor starter of claim 13 wherein the predetermined interval is long enough to allow transients due to inductive current switching to subside before the reversing polarity switches are turned off.

16. A solid state DC motor starter having a test capability that will test a plurality of components of the solid state DC motor starter while the motor starter is connected between a power source and a motor that the motor starter actuates, without actuating the motor, comprising:
   a main switch for turning the solid state DC motor starter and the motor on and off;
   a test circuit in parallel with the main switch, the test circuit comprising;
      a current reducing component;
      a test switch in series with the current reducing component, wherein the current reducing component maintains the current to the motor windings below a value that will actuate the motor when the test switch is turned on; and
      means for monitoring the voltage at an output of the respective plurality of components; and
   a delay switch in series with the main switch and in parallel with the test circuit, the delay switch remaining open for a pre-selected period of time when the main switch is first opened; and
   a resistor in parallel with the delay switch and in series with the main switch for reducing the current through the motor on initial start up of the motor during the pre-selected time the delay switch remains open.

17. The solid state DC motor starter of claim 1 including a snubber circuit in parallel with the main switch.

* * * * *